Dec. 18, 1934.　　H. W. BODENDIECK　　1,984,566
WIRE CLAMP
Filed Oct. 15, 1929　　2 Sheets-Sheet 2
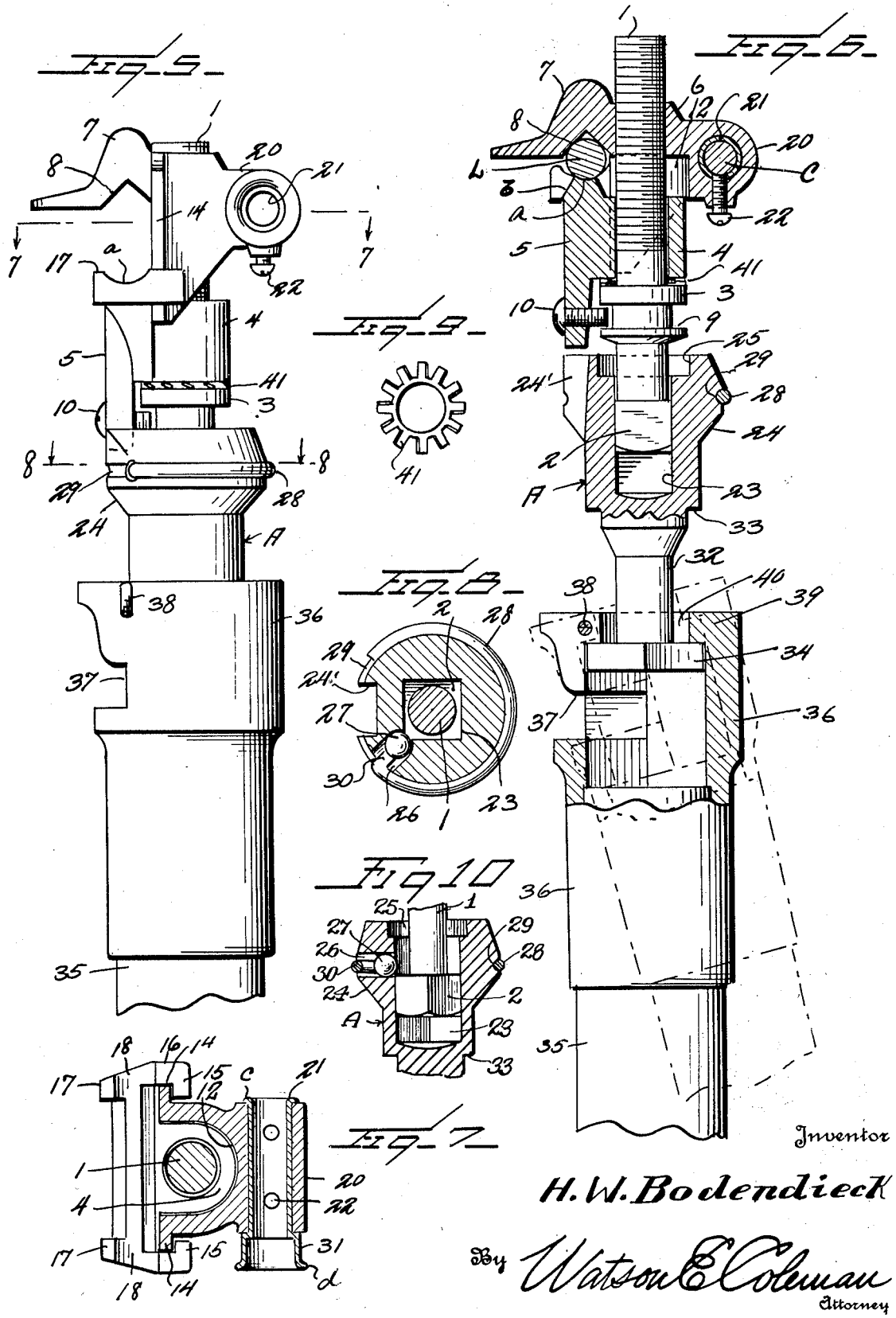

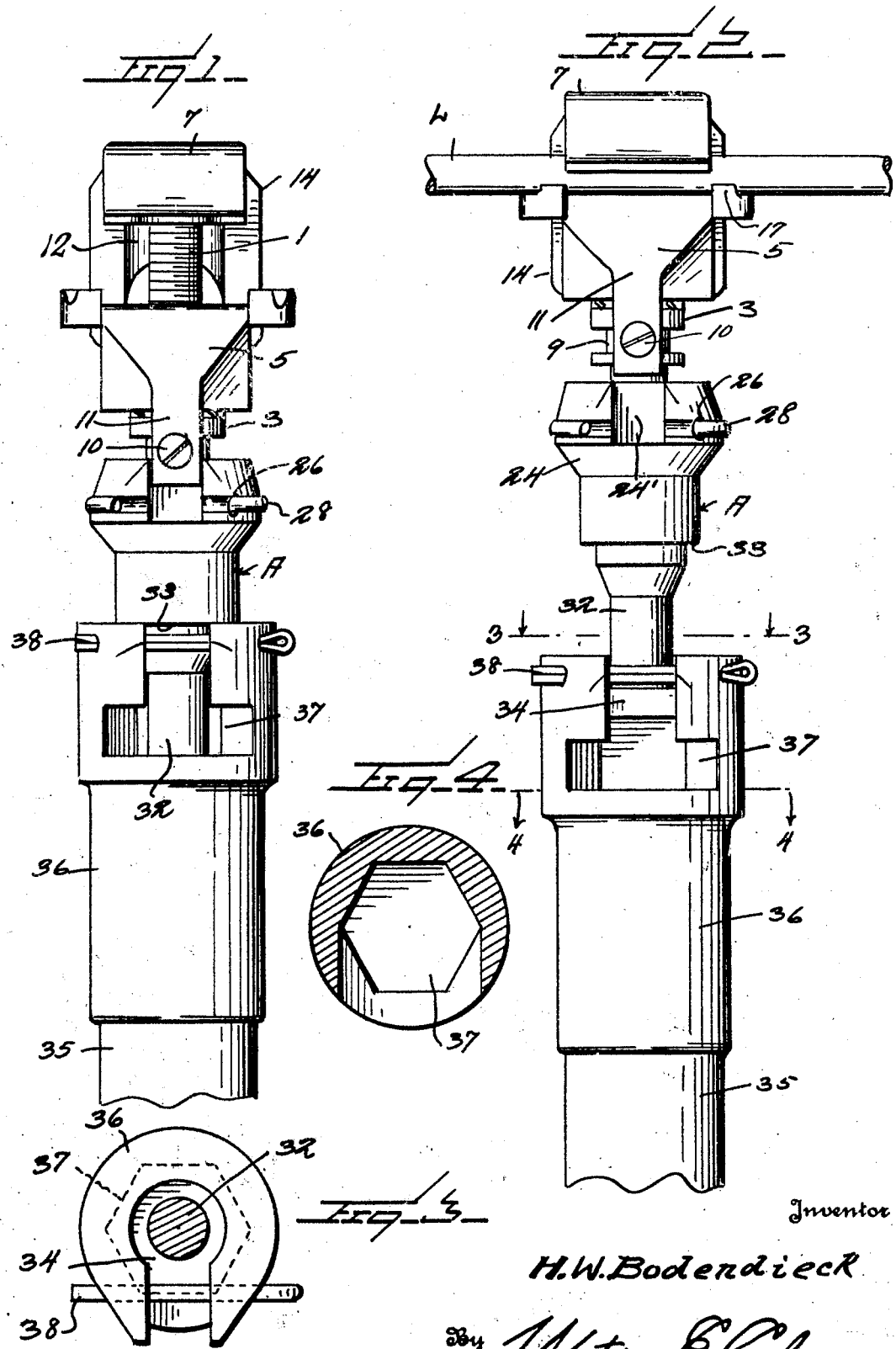

Patented Dec. 18, 1934

1,984,566

UNITED STATES PATENT OFFICE 1,984,566

WIRE CLAMP

Henry W. Bodendieck, Taylorville, Ill., assignor to Tip's Tool Company, Inc., Taylorville, Ill., a corporation of Illinois Application October 15, 1929, Serial No. 399,821

8 Claims. (Cl. 173—273)

This invention relates to a wire clamp, the same being an improvement on the clamp as embodied in my pending application Serial No. 244,761 filed January 5, 1928.

It is an object of the invention to provide a device of this kind including a clamp proper together with an adapter with which the clamp proper may be detachably engaged, the connection between the clamp proper and adapter being a swivel and wherein means is provided for holding the clamp proper against rotary movement independently of the adapter when so desired.

Furthermore, it is an object of the invention to provide a device of this kind including a clamp proper and an associated adapter together with means for engaging the adapter with an operating member or pole in a manner to permit relative universal movement or to lock the adapter to the operating member or pole against such relative universal movement.

Another object of the invention is to provide a clamp of this kind constructed in a manner to possess great strength and wherein means are provided to resist the vibrations created by a hot line to prevent loosening of the jaws of the clamp from the wire after being closed thereon.

An additional object of the invention is to provide a clamp of this kind wherein the various parts are constructed and assembled in a manner to assure the clamp when engaged with a hot line or the like to withstand excessive strain, thus eliminating the liability of breakage.

The invention consists in the details of construction and in the combination and arrangement of the several parts of my improved wire clamp whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in front elevation of a clamp and its associated parts constructed in accordance with an embodiment of my invention, the jaws of the clamp being opened and the adapter being in position with respect to the operating member or pole to lock the adapter against universal movement and the clamp proper and adapter being in a position to lock these parts against rotary movement;

Figure 2 is a view in front elevation with the clamp closed upon a line and with the adapter in position with respect to the pole or operating member to permit said pole or operating member to have relative universal movement;

Figure 3 is a sectional view taken substantially on the line 3—3 of Figure 2;

Figure 4 is a sectional view taken substantially on the line 4—4 of Figure 2;

Figure 5 is a view in side elevation of the structure as illustrated in Figure 1;

Figure 6 is a longitudinal sectional view taken through the device as illustrated in Figure 2 with certain of the parts in elevation;

Figure 7 is a sectional view taken substantially on the line 7—7 of Figure 5;

Figure 8 is a sectional view taken substantially on the line 8—8 of Figure 5;

Figure 9 is a view in plan of the lock washer as herein employed unapplied;

Figure 10 is a fragmentary view partly in section and partly in elevation showing the relative assembly of the holding member carried by the adapter and the head of the clamp proper when said head is within the adapter.

As disclosed in the accompanying drawings, the clamp proper comprises an elongated shank 1 provided at one end with an enlargement or head 2 angular in cross section and with an outstanding annular member 3 which, in the complete assembly, serves as a thrust element as will be hereinafter more fully set forth.

The major portion of the shank 1 outwardly of the member 3 is threaded, said outer portion, however, freely extending through a lug 4 carried by the central portion of a jaw plate 5. The outer edge face of the plate 5, as herein disclosed, has a groove $a$ disposed lengthwise thereof and which constitutes a contact surface which engages with the line L from below.

Threaded upon the shank 1 outwardly of the jaw plate 5 is a block 6 having a jaw extension 7 disposed over the working end of the jaw plate 5.

The under surface of this jaw extension 7 is provided thereacross with a groove or channel 8 in the form of an inverted V with the apex thereof normally substantially aligned with the transverse center of the groove or channel $a$ so that when the jaw plate 5 and the jaw extension 7 are in clamping engagement with the line L three points of contact are provided, thus eliminating the possibility of fusing and excessive heating. It is also to be noted that the opposed faces of the jaw plate 5 immediately adjacent to the groove or channel $a$ are inclined inwardly, as at $b$, towards said groove or channel $a$ so that said end portion of the jaw plate 5 will be received within the V-groove or channel 8 in the jaw extension 7. The advantage of this resides in the fact that the jaw plate 5 and the jaw extension 7 may be readily and effectively brought into proper clamping engagement with lines of various gauges or sizes and especially to permit the clamp to be employed with a line of materially small gauge as the inclined faces $b$ will permit the outer end of the plate 5 to closely approach the apex portion of the groove or channel 8 in the jaw extension 7.

The periphery of the member 3 is provided circumferentially therearound with a continuous groove or channel 9 into which extends an end portion of a machine screw 10 or a kindred part carried by the lower portion of an elongated arm 11 extending from the central portion of the inner end of the plate 5. By this means the plate 5 together with the lug 4 are maintained at all times in substantially a fixed position upon the shank 1 or against movement lengthwise of the shank 1, thus assuring the desired relative movements between the jaw plate 5 and the jaw extension 7 upon rotation of the shank 1.

The inner end of the block 6 is provided with a substantially semi-circular socket 12 in which is adapted to enter the lug 4 of the plate 5 during the relative movements between the plate 5 and the jaw extension 7. The jaw extension 7 is at the outer portion of the block 6 and said block 6 at opposite sides of the forward open face of the socket member 12 is defined by the outstanding and oppositely disposed thrust flanges 14 behind which engage the inwardly disposed lugs 15 carried by the short inwardly disposed arms 16 at the opposite ends of the upper portion of the jaw plate 5. The engagement of the lugs 15 with the flanges 14 is highly important as by this action the shank 1 is relieved of bending strain in applying the clamp to a line. These end portions of the jaw plate 5 are also provided with the outwardly disposed short arms 17. The upper surfaces of the inner portions of these short arms 16 and 17 are provided with merging cut away portions to provide recesses 18. These recesses 18 result in the provision of guiding means to facilitate the application of the clamp to the line. It is to be noted that the rear portions of the walls of the recesses 18 are of such formation to constitute cam faces which, as the jaw plate 5 and jaw extension 7 are forced into close contact with the line L, causes the upper portion of the lug 4 to bear from the rear tightly against the shank 1 and at the same time forces the lower portion of the plate 5 into tight contact with the lower portions of the flanges 14 until the lugs 15 engage the flanges 14.

It is to be understood that when the clamp is free from its work there is a slight play between the shank 1 and the wall of the bore of the lug 4 and also between the lugs 15 and the flanges 14, the arms 16 being of sufficient length to permit such relative movement. While this relative movement may be slight, yet by such provision the effectiveness of the tool is materially increased due to the fact that the lateral strain upon the shank 1 is materially reduced and thus minimizing the liability of the shank 1 bending.

The portion of the block 6 substantially diametrically opposed to the jaw extension 7 carries an integral barrel or sleeve 20, the bore of which being disposed substantially at right angles to the shank 1 when the block 6 is applied thereon. This barrel or sleeve 20 is provided with a cast-in lining 21 of suitable material, such as copper. This lining is of especial advantage in the event the barrel or sleeve is made of aluminum or kindred metal as the cast-in lining serves to exclude air from interference with the connection between an extremity of a jumper or ground wire inserted within the sleeve or barrel 20, thus eliminating possibility of electrolysis and high resistance joints between the copper jumper or take-off wire C and an aluminum conductor or line L. The barrel or sleeve 20 carries the conventional binding screws 22.

The inner end of the shank 1 together with its head 2 is adapted for insertion within a socket 23 extending axially of the head 24 of an adapter A. This socket 23 is angular in cross section to snugly receive the head 2 so that when said parts are engaged the shank 1 and adapter A are connected against independent rotation.

The socket 23, however, is of sufficient depth to permit the shank 1 to have direct endwise movement independently of the adapter A. The outer portion of the socket 23 is enlarged to provide a cylindrical pocket 25 to accommodate or receive the adjacent portion of the member 3 when the shank 1 is at the limit of its endwise movement towards the adapter A. The inward movement of the shank 1 is preferably limited by contact of the member 3 with the base wall of the pocket 25.

The head 24 of the adapter A is provided with a substantially radially disposed opening 26 in which is arranged a holding member 27, herein disclosed as a ball. The inner portion of the opening 26 is sufficiently restricted to prevent the member or ball 27 from entirely passing within the socket 23 but of a size to permit said member or ball 27 to extend a sufficient distance within the socket above the head 2 of the shank 1 to normally hold the assembled shank 1 and adapter A against separation. This locking member or ball 27 is constantly urged inwardly of its opening 26 by the spring member 28 partially surrounding the head 24 and engaged within a peripheral groove 29 provided in said head. One end portion of this spring 28 is provided with an inturned lug 30 having constant contact from without with the locking member or ball 27.

In engaging the shank 1 with the adapter A it is only required that sufficient stress be imposed upon the shank 1 or upon the adapter A to cause the head 2 of the shank 1 to pass the holding member or ball 27. To separate the shank 1 and the adapter A it is only required that sufficient strain be employed.

When the head 2 of the shank 1 is engaged from within with the stop member or ball 27 the member 3 carried by the shank 1 and also the plate 5 and tongue 11 will be entirely free of the adapter A, thus permitting the desired relative rotation between the shank 1 and the block 6 and lug 4 to effect desired relative adjustment between the jaw plate 5 and the jaw extension 7 to either apply or remove the clamp from a line L.

When the shank 1 is at the limit of its inward movement with respect to the adapter A, the free or outer end portion of the tongue 11 is snugly received within a groove or recess 24' provided in the periphery of the head 24 of the adapter A whereby relative movement between the shank 1 and the lug 4 and block 6 is prevented. This locking engagement is of advantage as it permits the lineman or operator to readily bend the jumper or bypass line engaged within the sleeve or barrel 20 as the character of the working operation may necessitate.

The lining 21 is provided with a bell-like extension 31 disposed beyond an end of the barrel or sleeve 20, the bore of the bell at all points being greater than the bore of the lining 21 proper. This bell extension is of advantage as it facilitates the insertion of the extremity of a jumper or bypass line within the barrel or sleeve 20, the enlarged bore of the extension 31 serving to receive the insulation of the cable, it being understood that the portion of the jumper or bypass line inserted directly within the sleeve or barrel 20 has been stripped of insulation as is the well known practice. At this time it is well to mention that while high tension lines are not insulated the bypass or jumper lines employed in connection therewith are insulated when used for grounding.

The end edge of the lining 21 remote from the bell extension 31 is upset or rounded, as at c, while the outer end portion of the bell extension 31 is outwardly flared, as at d. These rounded portions c and d eliminate cutting into the jumper or bypass line. On ordinary work an end portion of the jumper or bypass line will be inserted within the barrel or sleeve 20 through the bell extension 31 but in connection with work requiring bending of the jumper or bypass line an extremity of such jumper or bypass line is inserted within the barrel or sleeve 20 through the end thereof remote from the bell extension 31. It is to be stated, however, that this bending operation can also be effected with the bypass wire or jumper inserted through the bell extension 31 and the jumper or bypass wire will be bent in accordance with the flare d.

The adapter A also includes an elongated member 32, preferably cylindrical, the same being in longitudinal alignment with the socket 23 hereinbefore referred to. The portion of the member 32 adjacent to the head 24 is stepped to provide an annular shoulder 33 for a purpose to be hereinafter referred to. The outer end of the member 32 carries an enlarged head 34 angular in cross section.

Suitably affixed to an end portion of an operating member or elongated handle 35 is a socket member 36. The wall of the socket member 36 adjacent its outer end is provided with an inverted T-slot 37 to permit the outer end portion of the elongated member 32 and head 34 to be engaged within the socket member 36 upon inward lateral movement with respect thereto.

After this interlocking engagement has been effected accidental disengagement of the member 32 and head 34 from within the socket member 36 is prevented by closing the upper portion of the slot 37 by a cotter pin 38 or kindred member suitably disposed through the upper portion of the wall of the socket member 36 and bridging the slot 37. The bore of the socket member 36 is of such cross sectional configuration to snugly receive the head 34 of the elongated member 32 so that with the member 32 engaged within the socket member 36 the same are locked for unitary rotation upon turning movement of the handle 35. The bore of the socket member 36 is of a length to permit the extension 32 to pass inwardly of the socket member 36 a distance sufficient to bring the shoulder 33 in close contact with that portion of the outer end of the head 39 of the socket member 36 defining the central opening 40 through which the elongated member 32 is adapted to be disposed and with which central opening the upper portion of the slot 37 also communicates. It is also to be stated that the upper end of the slot 37, which is the stem portion of the slot, is also open.

At all times the socket member 36 and the head 34, when the adapter A and socket member 36 are in assembled relation, are engaged for unitary rotation and when the head 34 of the member 32 is substantially at the limit of outward movement with respect to the socket member 36, the member 32 and handle 35 are capable of limited universal movement. This is of advantage as the operator in applying a clamp to a line L the handle 35 can be laterally moved within certain limits with respect to the member 32 as the occasions of practice may require to facilitate the use of the handle 35 and more especially where wires or other obstructions may be prevented or desired rotation of the adapter A by the handle 35 with said handle 35 in direct longitudinal alignment with the shank 1.

In other words, it is to be understood that in order to effect the desired rotation of the shank 1 it is not essential that the handle 35 be in direct alignment therewith.

With the lug 4 and jaw plate 5 in proper assembly upon the shank 1 as maintained by the bolt or part 10, the inner end of the lug 4 is closely adjacent to the member 3. The opposed faces, however, of the lug 4 and the member 3 are at all times in close contact with an interposed lock washer 41. This washer 41 serves to effectively hold the shank 1 and lug 4 against relative rotation as the result of the vibration which is set up by the vibrations of the line L. It is also to be noted that through the medium of this interposed washer 41 the member 3 serves as a thrust member with respect to the lug 4, thus assuring effective coaction between the jaw plate 5 and the jaw extension 7.

From the foregoing description it is thought to be obvious that a wire clamp constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A clamping device comprising, in combination, a shank, a jaw plate freely mounted upon the shank, a block through which the shank is threaded and carrying a jaw extension for coaction with the jaw plate, an end portion of the shank having a head angular in cross section, an adapter having a socket to receive the end portion of the shank having the head, said shank being capable of endwise movement independently of the adapter, the adapter and the jaw plate having coacting means in engagement to hold the plate against rotation on the shank when the shank is at substantially the limit of its movement towards the adapter, said coacting means being ineffective when the shank is substantially at the limit of its endwise movement away from the adapter.

2. A clamping device comprising, in combination, a shank, a jaw plate freely mounted upon the shank, a block through which the shank is threaded and carrying a jaw extension for coaction with the jaw plate, an end portion of the shank having a head angular in cross section, an adapter having a socket to receive the end portion of the shank having the head, said shank being capable of endwise movement independently of the adapter, the adapter and the jaw plate having coacting means in engagement to hold the plate against rotation on the shank when the shank is at substantially the limit of its movement towards the adapter, said coacting means being ineffective when the shank is substantially at the limit of its endwise movement away from the adapter, and means for normally holding the shank and adapter against separation, said last named means being releasable under force.

3. A clamping device comprising, in combination, a shank, a jaw plate freely mounted upon the shank, a block through which the shank is threaded and carrying a jaw extension for coaction with the jaw plate, an end portion of the shank having a head angular in cross section, an adapter having a socket to receive the end portion of the shank having the head, said shank being capable of endwise movement independently of the adapter, the adapter and the jaw plate having coacting means in engagement to hold the plate against rotation on the shank when the shank is at substantially the limit of its movement towards the adapter, said coacting means being ineffective when the shank is substantially at the limit of its endwise movement away from the adapter, a member carried by the adapter for normally holding the shank and adapter against separation, and a spring carried by the adapter constantly urging the member into effective position, said spring allowing the member to shift upon abnormal strain or stress to permit the insertion of the shank within the adapter or to separate the same therefrom.

4. In combination with a clamp comprising two jaws one mounted for movement relative to the other, a headed shank for creating said relative movement of the jaws, a member having a socket to receive the portion of the shank having the head, said head and socket having coacting means to allow the same to rotate in unison, said socket member having a recess, one of the jaws of the clamp having a tongue adapted to be received within the recess of the member to hold said jaw against rotation around the shank, the shank and the socket member having relative movement lengthwise of the shank, and yieldable means for normally limiting the relative outward movement of the shank and socket member, the tongue of the jaw being of a length to be free of the recess of the socket member when the shank and socket member are at their normal limit of outward movement.

5. In combination with a clamp comprising two jaws one mounted for movement relative to the other, a headed shank for creating said relative movement of the jaws, a member having a socket to receive the portion of the shank having the head, said head and socket having coacting means to allow the same to rotate in unison, said socket member having a recess, one of the jaws of the clamp having a tongue adapted to be received within the recess of the member to hold said jaw against rotation around the shank, the shank and the socket member having relative movement lengthwise of the shank, yieldable means for normally limiting the relative outward movement of the shank and socket member, the tongue of the jaw being of a length to be free of the recess of the socket member when the shank and socket member are at their normal limit of outward movement, and means carried by the tongue and coacting with the shank to hold the jaw having the tongue against movement lengthwise of the shank.

6. In combination with a clamp comprising two jaws one mounted for movement relative to the other, a headed shank for creating said relative movement of the jaws, a member having a socket to receive the portion of the shank having the head, said socket member and head having coacting means to allow the same to rotate in unison, the shank and the socket member having relative movement lengthwise of the shank, and coacting means on one of the jaws and socket member to hold the jaw against rotation on the shank, said last named means being ineffective when the shank is substantially at the limit of its endwise movement away from the socket member.

7. In combination with a clamp comprising two jaws one mounted for movement relative to the other, a headed shank for creating said relative movement of the jaws, a member having a socket to receive the portion of the shank having the head, said head and socket having coacting means to allow the same to rotate in unison, said socket member having a recess, one of the jaws of the clamp having a part adapted to be received within the recess of the member to hold said jaw against rotation around the shank, the shank and the socket member having relative movement lengthwise of the shank, and means for normally limiting the relative outward movement of the shank and socket member, the part of the jaw receivable within the recess being of a length to be free of the recess of the socket member when the shank and socket member are at their normal limit of outward movement.

8. A clamping device comprising, in combination, a shank, a jaw plate freely mounted upon the shank, a block through which the shank is threaded and carrying a jaw extension for coaction with the jaw plate, an end portion of the shank having a head angular in cross section, a member having a socket to receive the portion of the shank having the head, said shank being capable of endwise movement independently of the socket member, the socket member and plate having coacting means to hold the plate against rotation when the shank is at substantially the limit of its movement toward the socket member, said coacting means being ineffective when the shank is substantially at the limit of its endwise movement away from the socket member.

HENRY W. BODENDIECK.